Jan. 28, 1964  M. KATZENSTEIN  3,119,428
MUFFIN OPENER
Filed May 18, 1962
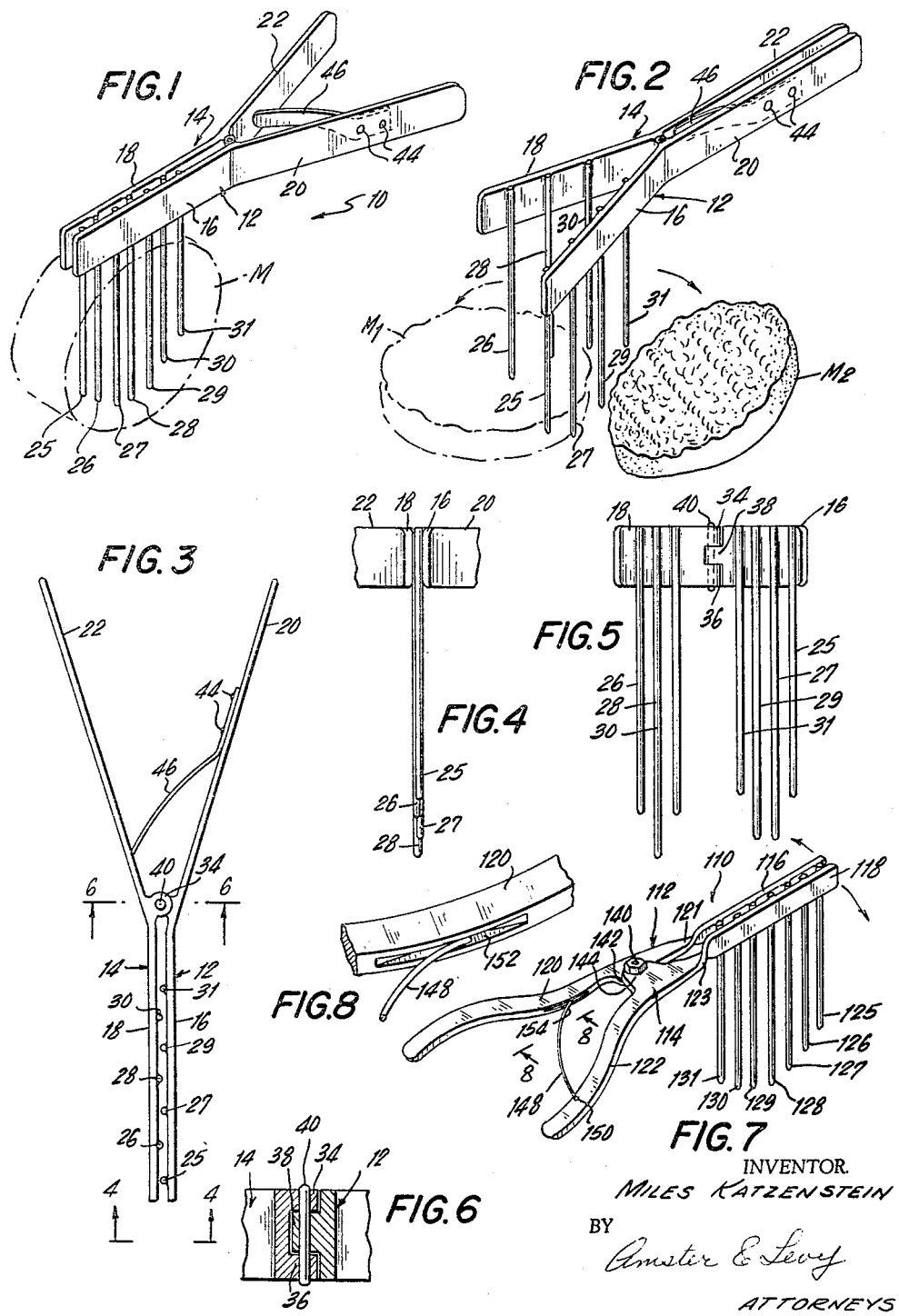
INVENTOR.
MILES KATZENSTEIN
BY
Amster E Levy
ATTORNEYS

United States Patent Office 3,119,428
Patented Jan. 28, 1964

3,119,428
MUFFIN OPENER
Miles Katzenstein, 87 Marion Ave., Mount Vernon, N.Y.
Filed May 18, 1962, Ser. No. 195,906
1 Claim. (Cl. 146—72)

The present invention relates to a device for opening muffins, rolls, scones or other baked foodstuffs.

Baked goods such as English muffins must be opened or pulled apart without cutting with a knife so as not to destroy the light, fluffy, inner texture thereof. When an English muffin is sliced with a knife, it will compact at the area where it has been cut detracting from its taste and texture.

It is very difficult to tear apart an English muffin. Various types of devices have heretofore been devised for separating an English muffin or the like into halves. These devices include a divider formed of a pair of frames having depending tines which frames are arranged normally in closely spaced relationship with the outermost portions of the frames adjacent the ends of the tines being hingedly connected together. Another form of muffin tearing device includes a complex framework arrangement having dependent tines for separating the muffin into its two halves. Various types of cutting devices for giving the English muffin a partially roughened surface along the cutting edge have also been devised. However, the prior muffin tearing or cutting devices have been largely unsatisfactory and not commercially exploitable due to the fact that they are exceedingly complicated and of a large size and require the use of careful machining of metal parts or do not satisfactorily tear the muffin apart.

The present invention overcomes the difficulties of the prior art devices by being adapted to simply and easily open a muffin, yet which muffin opener may be made out of various types of inexpensive material, and in fact may be molded out of synthetic plastic materials at a very low cost thereby permitting wide use and distribution.

An object of the present invention resides in the provision of a muffin opener which is arranged so as to have tines which can easily penetrate an English muffin or the like, yet which tines are of a size just long enough so as to fully pierce the muffin while being short enough to be resistant to breakage.

Another object of the invention resides in the provision of a muffin opener that can be operated in a simple manner by a person using only one hand on the muffin opener which leaves the other hand free to hold the muffin being opened.

Still another object of the invention resides in the provision of a muffin opening device which is adapted to open a muffin in a manner so as to leave a desired rough surface siutable for toasting yet which eliminates the necessity of tearing the muffin apart by hand which very often incapacitates the muffin for toasting purposes.

Still further objects and features of this invention reside in the provision of a muffin opener that is simple in construction, easy to operate, which is attractive in appearance and of a relatively compact size, thereby rendering it a useful device for every kitchen, and which is inexpensive to manufacture.

These, together with the various ancillary objects and features of the invention which will become apparent as the following description proceeds, are attained by this muffin opener, preferred embodiments of which have been illustrated in the accompanying drawing, by way of example only, wherein:

FIG. 1 is a perspective view of an embodiment of muffin opener shown with the tines in their normally closed position as inserted into a muffin;

FIG. 2 is a perspective view of a muffin opener shown with the tines thrust into the open position so as to open an English muffin into two halves;

FIG. 3 is a plan view of the muffin opener;

FIG. 4 is an end elevational view taken along the plane of line 4—4 in FIG. 3;

FIG. 5 is a view similar to that of FIG. 4, but illustrating the muffin opener in an open position;

FIG. 6 is an enlarged sectional detail view taken along the plane of line 6—6 in FIG. 3;

FIG. 7 is a perspective view of a modified form of the invention; and

FIG. 8 is an enlarged sectional detail view taken along the plane of line 8—8 in FIG. 7.

With continuing reference to the accompanying drawing wherein like reference numerals designate similar parts throughout the various views, reference numeral 10 is used to generally designate an embodiment of muffin opener constructed in accordance with the concepts of the present invention. The muffin opener 10 includes a pair of bars 12 and 14. The bars 12 and 14 include front working sections 16 and 18 which are integrally formed with rear handle sections 20 and 22. The bars 12 and 14 are considerably deeper than the thickness thereof and may be formed of any suitable material such as metals or various synthetic plastic materials. It has been found that the muffin opener may be molded out of the relatively high strength plastic material such as polystyrene at a relatively low cost so as to achieve a light weight, highly attractive and easily operable kitchen utensil. A plurality of spaced tines 26, 28, 30 are integrally formed with the front working part 18 of the bar 14 and depend therefrom. These tines 26, 28 and 30 are of cylindrical rod shape and extend inwardly of the front open portion 18 toward the front working portion 16. Integrally formed with the front working part 16 are tines 25, 27, 29 and 31 which likewise are of cylindrical rod shape and depend from the front working portion 16 while extending toward the front working portion 18. As will be noted from an inspection of FIG. 1, the tines 26, 28 and 30 are staggered with respect to the tines 25, 27, 29 and 31. The tines are aligned in a common plane with the muffin opener in the closed position as shown in FIG. 1, and the tines are equally spaced. It is noted that the central tine 28 is the longest of the tines while the tines 27 and 29 are slightly shorter than tine 28, the tines 26 and 30 being slightly shorter than tines 27 and 29, and the outermost tines 35 and 31 are the shortest of the tines. Thus, the tines conform to the arcuate shape at their outermost edges of a muffin or the like so that when the tines have fully penetrated the muffin, there is no considerable overhang of the tines. This is desirable since the tines should be only so long as is necessary to properly do the job of opening the muffins while not being so long as to be of a reduced strength.

Integral with the bar 14 are a pair of knuckles 34 and 36 and integral with the bar 12 is the knuckle 38. A pintel 40 serves to provide a pivotal or hinged connection between the bars 12 and 14 and extends through the aligned knuckles 34, 36 and 38.

Secured as by rivets 44 or the like to the handle portion 20 of the bar 12 is a spring 46. This spring may alternatively be integrally formed with the bar 20 and engages the handle portion 22 of the bar 14 so as to normally thrust the handle portions 20 and 22 apart as shown in FIG. 1. However, the spring is compressed upon manually compressing the handle portions 20 and 22 into the position as shown in FIG. 2.

In operation, the muffin opener is inserted into a muffin M at approximately the center position thereof and with the tines extending into or nearly through the muffin ends, the handle portions 20 and 22 are compressed together as shown in FIG. 2 splitting the muffins into halves M₁ and M₂.

Returning now to the embodiment of the invention as shown in FIG. 7, it will be noted that herein the bars 112 and 114 of the muffin opener 10 are twisted so that while the front working portions 116 and 118 are similar in shape to the respective parts shown in FIG. 1, the handle portions 120 and 122 are twisted as at 121 and 123 so that the handle portions lie in planes normal to the planes of the working portions 116 and 118.

The plurality of tines 125, 127, 129, 131 depend from the front working portion 118 while alternately spaced between the tines 125, 127, 129 and 131 and depending from the front working portion 116 of the tines 126, 128, 130. In this form of the invention the tine 128 is the longest of the tines and is slightly longer than the tines 127, 129 which in turn are longer than the tines 126, 130. The tines 125 and 131 which are disposed at the outermost of the tines are the shortest tines. Thus, when all of the tines are inserted into a muffin, there is no large portion of any tine, particularly of the outermost tines, which extend far beyond the muffin and are thus likely to be broken or to be weakened because of the excessive lever arm that can be applied thereon.

A suitable hinge arrangement 140 is arranged so as to include and extend through projections 142 and 144 integrally formed with the handle portions 120 and 122 with the hinge arrangement further including a threaded pin and nut, the pin extending through aligned apertures in the projections 142 and 144. A spring 148 is secured by any suitable means 150 to the handle portion 122 and lies in a slot 152 preferably of an arcuate shape formed in the handle portion 120. The slot itself is of an arcuate contour so that the end 154 of the spring 148 which lies in the slot 152 is subject to a camming action. The spring 158 will normally urge the tines to their closed position as shown in FIG. 7.

The form of the invention as shown in FIGS. 7 and 8 functions in the same manner as the other embodiment of the invention illustrated in FIGS. 1 through 6 in that it is merely necessary to compress the handle portions 120 and 122 against the force of the spring 148 to open the tines after the tines have been inserted in a muffin to open the muffin.

A latitude of modification, change and substitution is intended in the foregoing disclosure and in some instances some features of the invention will be employed without a corresponding use of other features. Accordingly, it is appropriate that the appended claim be construed broadly and in a manner consistent with the spirit and scope of the invention herein.

What I claim is:

A muffin opener comprising a pair of bars hingedly connected to each other, said bars having normally divergently extending handle portions and normally closely proximate working portions having opposed inner faces, said working portions having elongated longitudinal axes, a plurality of tines arranged normally in a linearly aligned relationship depending perpendicularly from said faces of said working portions, spring means secured to one of said handle portions and engaging the other of said handle portions to urge said bars into their normal position, said tines when said handle portions are moved together moving into spaced apart parallel position with the tines on said working portions being aligned in planes extending divergently with respect to each other, each of said faces of said working portions normally engaging the tines depending from the other of said front portions to arrange both sets of said tines in a common plane, the centrally disposed of said tines being the longest, the forwardmost and rearwardmost of said tines being the shortest.

References Cited in the file of this patent
UNITED STATES PATENTS

| | | |
|---|---|---|
| 326,909 | Kricker | Sept. 22, 1885 |
| 544,268 | Unsinger et al. | Aug. 6, 1895 |
| 2,818,097 | Glanz | Dec. 31, 1957 |
| 2,979,095 | Jovis | Apr. 11, 1961 |